United States Patent
Nakatou et al.

(10) Patent No.: US 11,782,017 B2
(45) Date of Patent: Oct. 10, 2023

(54) PUMP ELECTRODE AND REFERENCE ELECTRODE FOR GAS SENSOR

(71) Applicant: DENSO CORPORATION, Kariya (JP)

(72) Inventors: Mitsunobu Nakatou, Kariya (JP); Keigo Mizutani, Nishio (JP); Takashi Araki, Kariya (JP); Tadashi Nakamura, Nagakute (JP)

(73) Assignees: DENSO CORPORATION, Kariya (JP); KABUSHIKIKAISHA TOYOTA CHUO KENKYUSHO, Nagakute (JP)

( * ) Notice: Subject to any disclaimer, the term of this patent is extended or adjusted under 35 U.S.C. 154(b) by 93 days.

(21) Appl. No.: 15/742,148

(22) PCT Filed: Jul. 4, 2016

(86) PCT No.: PCT/JP2016/069745
§ 371 (c)(1),
(2) Date: Jan. 5, 2018

(87) PCT Pub. No.: WO2017/006892
PCT Pub. Date: Jan. 12, 2017

(65) Prior Publication Data
US 2018/0202965 A1    Jul. 19, 2018

(30) Foreign Application Priority Data
Jul. 8, 2015  (JP) .............................. JP2015-137023

(51) Int. Cl.
*G01N 27/41* (2006.01)
*G01N 27/407* (2006.01)
(Continued)

(52) U.S. Cl.
CPC ........... *G01N 27/41* (2013.01); *G01N 27/409* (2013.01); *G01N 27/4074* (2013.01); *G01N 27/4075* (2013.01); *G01N 27/419* (2013.01)

(58) Field of Classification Search
CPC ............... G01N 27/41; G01N 27/4074; G01N 27/4075; G01N 27/409; G01N 27/419
See application file for complete search history.

(56) References Cited

U.S. PATENT DOCUMENTS

| 4,790,925 A | * | 12/1988 | Miller | ................ | G01N 27/4045 204/408 |
| 6,592,731 B1 | * | 7/2003 | Lawless | ............. | G01N 27/4071 204/426 |

(Continued)

FOREIGN PATENT DOCUMENTS

| DE | 102013213673 A1 * | 1/2015 | ......... G01N 27/4075 |
| JP | 2004-294079 | 10/2004 | |

(Continued)

OTHER PUBLICATIONS

D.C. Skelton et al. A surface-science-based model for the selectivity of platinum-gold alloy electrode in zirconia-based NOx sensors, 96 Sensors and Actuators B 2003 p. 46-52. (Year: 2003).*

*Primary Examiner* — Caitlyn Mingyun Sun
(74) *Attorney, Agent, or Firm* — Nixon & Vanderhye P.C.

(57) ABSTRACT

On a cross sectional surface X1 of a pump electrode 3 in a gas sensor element forming a gas sensor, a noble metal area 31 having Pt—Au aggregations, a solid electrolyte area 32 having solid electrolyte aggregations, a mixture area in which Pt—Au alloy and solid electrolyte are distributed, and pores 34. The mixture area 33 is formed within a range of 30 to 90% in an overall area of the cross sectional surface X1, excepting the pores 34. The pores are formed adjacent to the mixture area 33.

7 Claims, 9 Drawing Sheets

(51) Int. Cl.
*G01N 27/409* (2006.01)
*G01N 27/419* (2006.01)

(56) References Cited

U.S. PATENT DOCUMENTS

| | | | |
|---|---|---|---|
| 2001/0052471 | A1 | 12/2001 | Nakagawa et al. |
| 2003/0116448 | A1 † | 6/2003 | Nakae |
| 2005/0061670 | A1 | 3/2005 | Tanaka et al. |
| 2009/0280240 | A1 | 11/2009 | Ohya et al. |
| 2013/0255352 | A1 | 10/2013 | Ohtsubo et al. |
| 2014/0311906 | A1 * | 10/2014 | Oya .................. G01N 27/4075 204/424 |
| 2015/0293051 | A1 * | 10/2015 | Kajiyama .......... G01N 27/4075 204/424 |
| 2016/0209354 | A1 | 7/2016 | Araki et al. |
| 2018/0003670 | A1 | 1/2018 | Oya et al. |

FOREIGN PATENT DOCUMENTS

| | | | | |
|---|---|---|---|---|
| JP | 2007-225616 | | 9/2007 | |
| JP | 2009-257826 | | 11/2009 | |
| JP | 2013-096888 | | 5/2013 | |
| JP | 2013-104737 | | 5/2013 | |
| WO | WO-2013088674 | A1 * | 6/2013 | ............. G01N 27/41 |
| WO | WO-2014080867 | A1 * | 5/2014 | ......... G01N 27/4075 |

\* cited by examiner
† cited by third party

PUMP ELECTRODE AND REFERENCE ELECTRODE FOR GAS SENSOR

This application is the U.S. national phase of International Application No. PCT/JP2016/069745 filed Jul. 4, 2016 which designated the U.S. and claims priority to JP Patent Application No. 2015-137023 filed Jul. 8, 2015, the entire contents of each of which are hereby incorporated by reference.

TECHNICAL FIELD

The present invention relates to pump electrodes and reference electrodes to be formed on surfaces of a solid electrolyte body in a gas sensor.

BACKGROUND ART

A gas sensor is arranged in an exhaust gas purification system of an internal combustion engine, and used to detect a concentration of a specific gas, for example NOx (nitrogen oxide) contained in a target gas to be measured. This target gas is exhaust gas which flows in the exhaust gas purification system. The gas sensor has a gas sensor element. In general, the gas sensor element is produced by applying a paste of electrode material containing noble metal and a solid electrolyte on a surface of a ceramic sheet, which forms the solid electrolyte body, and by firing the ceramic sheet with the electrode material. In the gas sensor, oxide ions are generated when the target gas is in contact with a three phase boundary formed by noble metal and solid electrolyte. For this reason, the oxygen decomposition of a gas sensor drastically varies due to a degree of contact between noble metal, solid electrolyte and target gas to be measured.

For example, Patent document 1 shows a gas sensor having an electrode composed of a noble metal area made of noble metal, a solid electrolyte area made of solid electrolyte, and a mixture area of noble metal and solid electrolyte when viewed on a cross section of the electrode. The formation of the mixture area at a boundary part between the noble metal area and the solid electrolyte area can increase a degree of generating oxide ions from oxygen molecules contained in target gas, and provides a stable sensor output.

CITATION LIST

Patent Literature

[Patent document 1] Japanese patent laid open publication No. JP 2014-122878

SUMMARY OF INVENTION

Technical Problem

However, in the gas sensor shown in patent document 1, because the mixture area of noble metal and solid electrolyte is formed only at a boundary part between the noble metal area and the solid electrolyte area, the mixture area has an insufficient distribution of the mixture area in the gas sensor. Further, in order to increase a three phase boundary area composed of noble metal, solid electrolyte and target gas to be measured, it is necessary to form pores correctly through which the target gas is introduced into the inside of the electrode. Because pores are not adequately formed in the structure of the electrode shown in Patent document 1, it is difficult to increase the three phase boundary area and enhance the oxygen decomposition of the electrode.

The present invention has been made in consideration of the foregoing circumstances, and it is an object of the present invention to provide a pump electrode, a reference electrode and a gas sensor equipped with the pump electrode and the reference electrode. The pump electrode and the reference electrode have an improved structure capable of increasing oxygen decomposition with high efficiency, in which a mixture area and pores are formed in an optimum ratio. The mixture areas is a mixture of noble metal and solid electrolyte. Through the pores, exhaust gas or reference gas is introduced into the electrode of the gas sensor.

Solution to Problem

In accordance with one aspect of the present invention, there is provided a pump electrode for a gas sensor. The pump electrode is formed on a target gas-side surface of a solid electrolyte body having ion conductivity. The target gas-side surface is exposed to a target gas to be measured. The pump electrode decomposes oxygen contained in the target gas into oxide ions when an electric power is supplied to the pump electrode. The oxide ions pass through the solid electrolyte body and are discharged to a reference gas-side surface of the solid electrolyte body which is arranged in opposite to the target gas-side surface. The pump electrode is made of Pt—Au alloy and a solid electrolyte made of ceramic material which is the same type of ceramic material forming the solid electrolyte body. A first noble metal area, a first solid electrolyte area, a first mixture area and first pores are formed in the pump electrode. A cross section of the pump electrode is cut along a thickness direction of the pump electrode. Pt—Au alloy aggregations are formed in the first noble metal area. Solid electrolyte aggregations are formed in the first solid electrolyte area. A mixture of Pt—Au alloy and the solid electrolyte is formed in the first mixture area. The first mixture area has an area within a range of 30 to 90% in an overall area of the cross section excepting an area of the first pores on the cross section of the pump electrode. The first pores are formed adjacent to the first mixture area.

In accordance with another aspect of the present invention, there is provided a reference electrode for a gas sensor. The reference electrode is formed on a reference gas-side surface of a solid electrolyte body on which reference gas is exposed. The solid electrolyte body has ion conductivity, and oxide ions are decomposed from oxygen contained in a target gas to be measured when electric power is supplied to the reference electrode.

The target gas is exposed onto a target gas-side surface of the solid electrolyte body which is opposite to the reference gas-side surface. The oxide ions pass through the solid electrolyte body and are discharged to the reference gas-side surface of the solid electrolyte body. The reference electrode is made of Pt and a solid electrolyte made of ceramic material which is the same type of ceramic material forming the solid electrolyte body. A second noble metal area, a second solid electrolyte area, a second mixture area and second pores are formed in the reference electrode. A cross section of the reference electrode is cut along a thickness direction of the reference electrode. Pt aggregations are formed in the second noble metal area. Solid electrolyte aggregations are formed in the second solid electrolyte area. A mixture of Pt and the solid electrolyte is formed in the second mixture area. The second mixture area has an area within a range of 30 to 90% in an overall area of the cross section excepting an area of the second pores on the cross section of the reference electrode. The second pores are formed adjacent to the second mixture area.

Advantageous Effects of Invention

In a cross section of the pump electrode, which is perpendicular to a thickness direction of the pump electrode, of a gas sensor according to one aspect of the present invention, the first noble metal area, the first solid electrolyte area, the first mixture area and the first pores are formed. The first mixture area has the area within the range of 30 to 90% of the overall area of the cross section excepting the area of the first pores on the cross section of the pump electrode. This structure makes it possible to allow the first mixture area to have a widely distributed area in the pump electrode to be formed on the overall area of the pump electrode. That is, this structure makes it possible to increase the contact areas between the mixture area and the target gas to be measured.

Further, the first pores are formed in the cross section of the pump electrode so that the pores are arranged adjacent to the first mixture area. This improved structure allows the target gas to be measured introduced in the first pores to be easily contact with the first mixture area, and to easily increase the three phase boundary area between noble metal, the solid electrolyte and the target gas to be measured with high efficiency. Accordingly, because the first mixture area in which noble metal and the solid electrolyte are mixed, and the first pores are appropriately formed in the pump electrode with high efficiency, this structure makes it possible to enhance oxygen decomposition with high efficiency.

Similar to the structure of the pump electrode previously described, the second mixture area is widely distributed in the reference electrode as another aspect of the present invention. That is the second mixture area is formed on the overall area of the reference electrode. This structure increases the contact area of the second mixture area and the reference gas. In addition, the second pores are formed adjacent to the second mixture area in a cross section of the reference electrode. This structure makes it possible for the reference gas introduced in the second pores to be contact with the second mixture area This improved structure allows the reference gas introduced in the second pores to be easily contact with the second mixture area, and to easily increase the three phase boundary area between noble metal, the second solid electrolyte and the reference gas to be measured with high efficiency. Accordingly, because the second mixture area in which noble metal and the second solid electrolyte are mixed, and the second pores are appropriately formed in the reference electrode with high efficiency, this structure makes it possible to enhance oxygen decomposition with high efficiency.

It is possible for a gas sensor to have both the pump electrode according to one aspect of the present invention and the reference electrode according to another aspect of the present invention.

According to one aspect of the present invention, it is acceptable to form the mixture area in the overall area, excepting the noble metal area, the solid electrolyte body area or the pores area, from a boundary position of the solid electrolyte body to a surface position of the pump electrode in the overall area. Also, when the mixture area is less than 30% of the overall area, excepting the pores, on the cross section of the pump electrode, the mixture area does not have a sufficient area and does not adequately provide its oxygen decomposition.

On the other hand, it is difficult to form the mixture area of more than 90% in the overall area of the pump electrode in view of manufacture constraints. Further, the overall area, excepting the pores, represents the area including the noble metal area, the solid electrolyte area and the mixture area.

The noble metal area, the solid electrolyte area and the mixture area, excepting the pores, are together described as the overall area. The mixture area separate noble metal areas and solid electrolyte areas, in the overall area.

The mixture area indicates the area in the overall area, excepting the pores, the noble metal area and the solid electrolyte area on the cross section of the pump electrode. In addition, the mixture area contains both the Pt—Au alloy and the solid electrolyte. In the mixture area, Pt—Au alloy and the solid electrolyte are mixed with each other in a three-dimensional complicated structure. In the mixture area, the Pt—Au phase and the solid electrolyte phase are mixed in a complicated intermingled structure. At least a part of the Pt—Au alloy and the solid electrolyte in the mixture area is connected to the Pt—Au alloy in the noble metal area, the solid electrolyte in the solid electrolyte area or the solid electrolyte body, respectively.

When a cross-sectional surface of the pump electrode is observed, there are plural boundary lines in the mixture area, each of the boundary lines separates the Pt—Au alloy area from the solid electrolyte area.

The area including the inter-grain boundaries, each of which separates the Pt—Au alloy from the solid electrolyte, is an area having not less than two boundary lines per 0.5 μm square in the mixture area. In other words, in the area having the plural boundary lines, the Pt—Au alloy is not separated from the solid electrolyte by one inter-area boundary only.

It is possible to use an area of 0.1 μm² having an optional shape, instead of using the area of 0.5 μm square.

According to another aspect of the present invention, it is acceptable to form the mixture area from the boundary position of the solid electrolyte body to the surface position of the reference electrode, in the overall area excepting the noble metal area and the solid electrolyte area or the pores area.

When the mixture area is less than 30% of the overall area, excepting the pores, on the cross section of the reference electrode, the mixture area is not sufficient area and does not adequately provide its oxygen decomposition. On the other hand, it is difficult to form the mixture area of more than 90% of the overall area on the reference electrode in view of manufacture constraints.

The noble metal area, the solid electrolyte area and the mixture area, excepting the pores, are together described as the overall area. The mixture area separate noble metal areas and solid electrolyte areas, in the overall area.

The mixture area indicates the area on the overall area excepting the pores, the noble metal area and the solid electrolyte area on the cross section of the reference electrode. In addition, the mixture area contains both Pt and the solid electrolyte. In the mixture area, Pt and the solid electrolyte are mixed with each other in a three-dimensional complicated structure. In the mixture area, the Pt phase and the solid electrolyte phase are mixed in a complicated intermingle structure. At least a part of Pt and the solid electrolyte in the mixture area is connected to Pt in the noble metal area, the solid electrolyte in the solid electrolyte area or the solid electrolyte body, respectively.

When a cross-sectional surface of the reference electrode is observed, there are plural boundary lines in the mixture area, and each of the boundary lines separates the Pt area from the solid electrolyte area.

The area including the inter-grain boundaries, each of which separates Pt from the solid electrolyte, is an area having not less than two boundary lines in each 0.5 μm square in the mixture area. In other words, in the area having the plural boundary lines, Pt is not separated from the solid electrolyte by one inter-area boundary only.

It is possible to use an area of 0.1 μm² having an optional shape, instead of using the area of 0.5 μm square.

DESCRIPTION OF EMBODIMENTS

Figure 1:
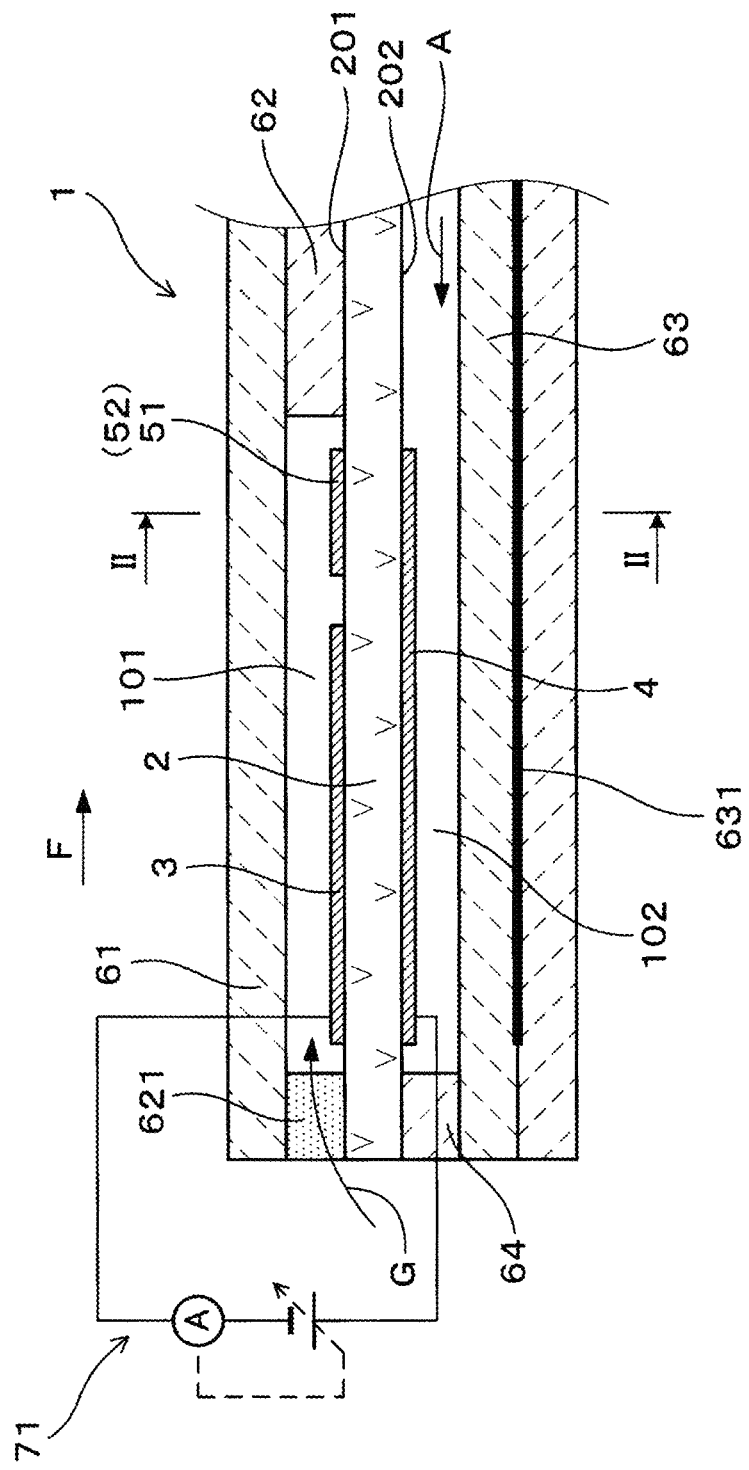
FIG. 1 is a cross sectional view showing a gas sensor element having a pump electrode and a reference electrode according to exemplary embodiments of the present invention.
Figure 2:
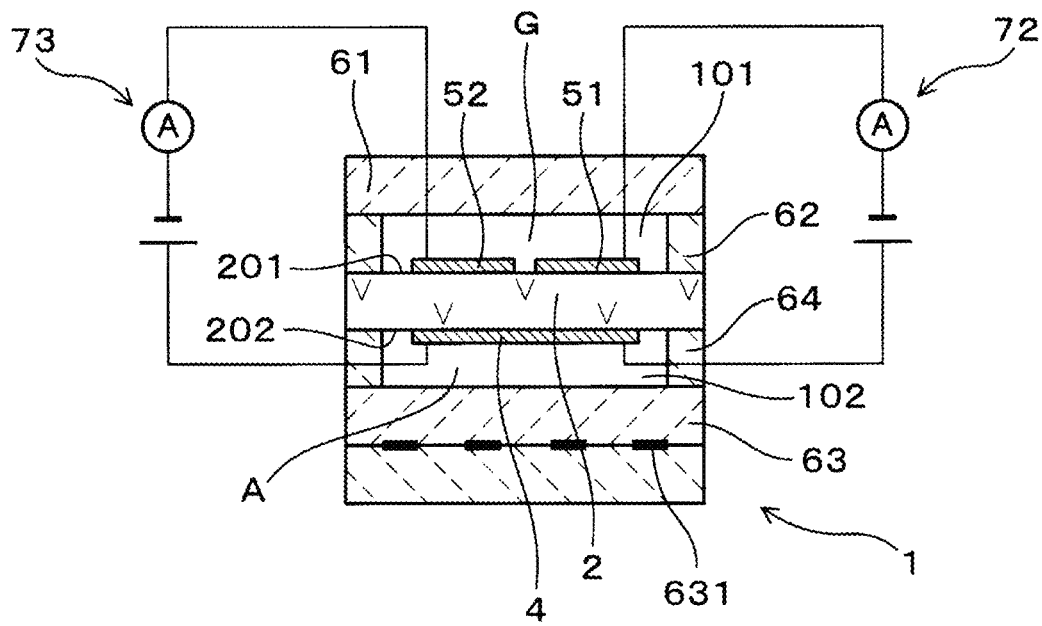
FIG. 2 is a view, across the II-II line in FIG. 1, showing the gas sensor element having the pump electrode and the reference electrode according to the exemplary embodiments of the present invention.

A description will be given of a pump electrode and a reference electrode in a gas sensor according to exemplary embodiments of the present invention with reference to figures. As shown in FIG. 1 and FIG. 2, the pump electrode 3 in the gas sensor according to an exemplary embodiment is formed on a target gas-side surface 201, which is exposed to a target gas G to be measured, of a solid electrolyte body 2 having ion conductivity. When receiving an electric power, the pump electrode 3 decomposes oxygen contained in the target gas G to be measured to oxide ions. The oxide ions pass through the inside of the solid electrolyte body 2 and are discharged to a reference gas-side surface 202 of the solid electrolyte body 2, which is opposite in position to the target gas-side surface 201. The pump electrode 3 is made of Pt—Au alloy and solid electrolyte. The solid electrolyte is made of ceramic material which is the same type of ceramic material forming the solid electrolyte body 2.

Figure 3:
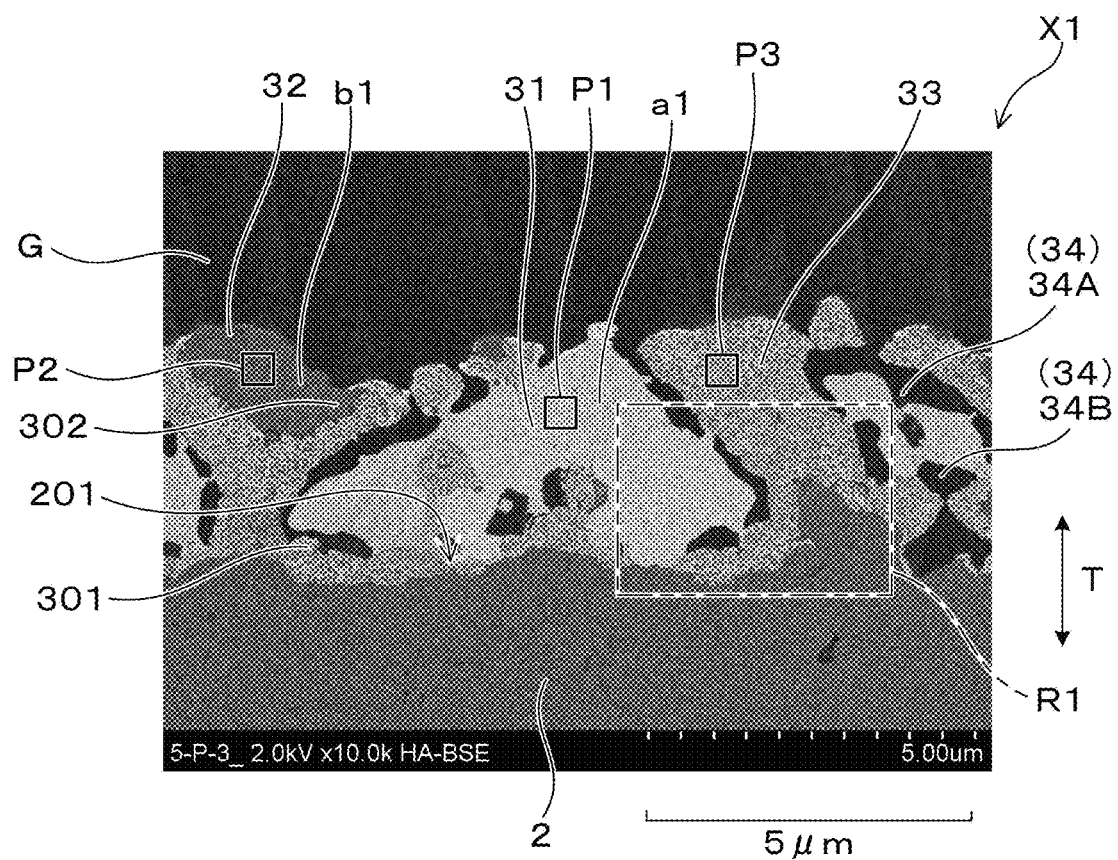
FIG. 3 is a SEM photograph showing a cross sectional surface of the pump electrode according to the exemplary embodiment of the present invention.
Figure 4:
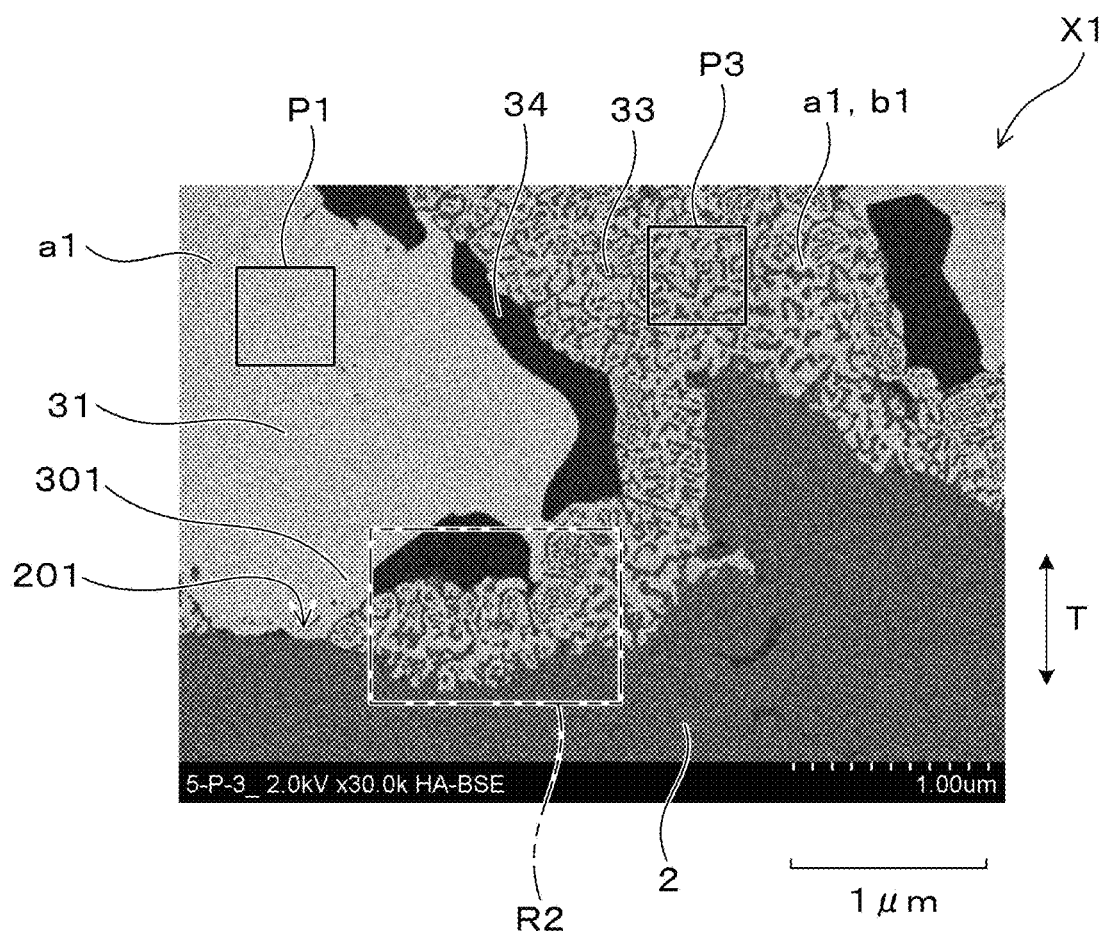
FIG. 4 is an enlarged view showing a part of the SEM photograph shown in FIG. 3.
Figure 5:
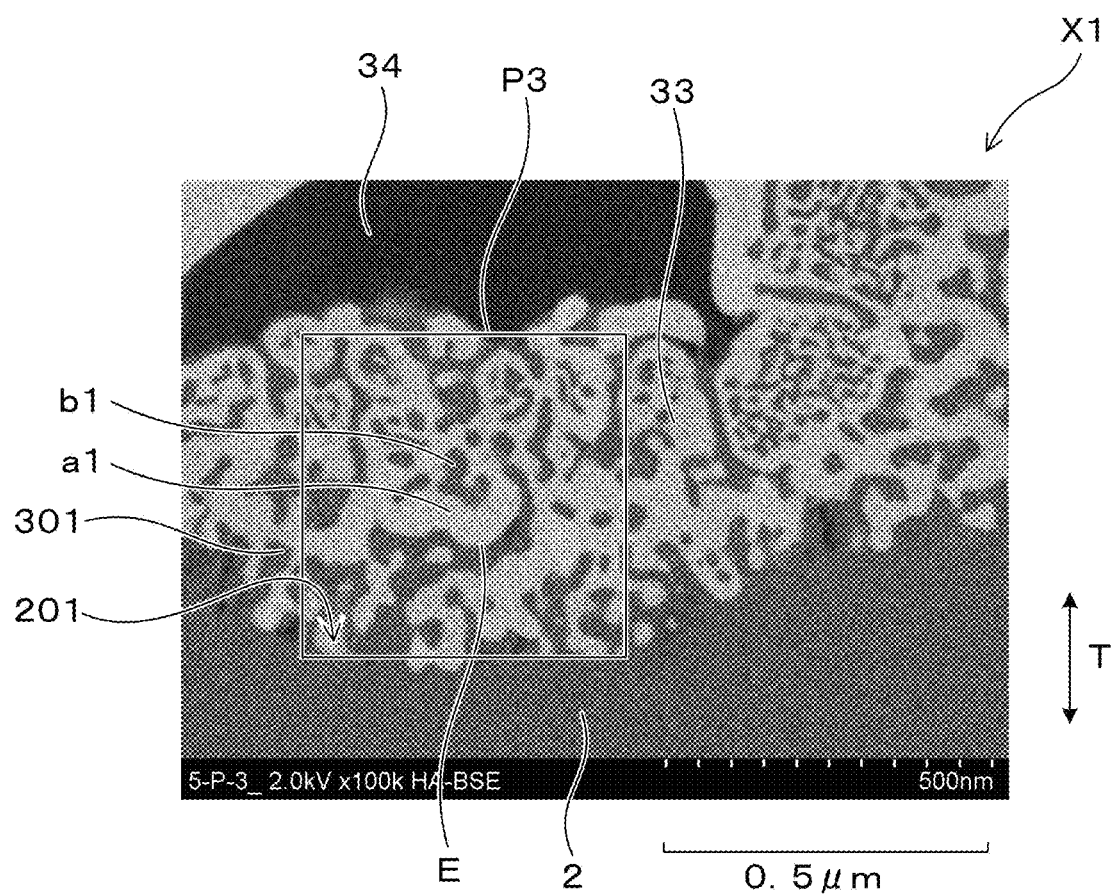
FIG. 5 is an enlarged view showing a part of the SEM photograph shown in FIG. 4.

As shown in FIG. 3 to FIG. 5, a noble metal area (a first noble metal area) 31, a solid electrolyte area (a first solid electrolyte area) 32, a mixture area (a first mixture area) 33, and pores (first pores) 34 are formed on a cross sectional surface X1 which is cut along a thickness direction T of the pump electrode 3. Pt—Au alloy aggregations are formed in the noble metal area 31. Solid electrolyte aggregations are formed in the solid electrolyte area 32. A mixture of Pt—Au alloy and the solid electrolyte is formed with patchy distribution in the mixture area 33. At least a part of the mixture area 33 is formed from the boundary position (a first boundary position) 301 adjacent to the target gas-side surface 201 of the solid electrolyte body 2 to a surface position 302 of the pump electrode 3. The mixture area 33 is formed within a range of 30 to 90% of the overall area, excepting the pores 34, on the cross sectional surface X1 (the cross sectional surface of the pump electrode). The pores 34 are formed adjacent to the mixture area 33. In each of the drawings, reference character a1 represents the Pt—Au alloy, and reference character b1 indicates the solid electrolyte.

As shown in FIG. 1 and FIG. 2, the reference electrode 4 according to the exemplary embodiment is formed on the reference gas-side surface 202, which is exposed to a reference gas, of the solid electrolyte body 2. When receiving an electric power, the reference electrode 4 is used for discharging, to the reference gas-side surface 202, oxide ions decomposed from oxygen contained in the target gas G. The target gas is exposed to the target gas-side surface 201 of the solid electrolyte body 2. The reference electrode 4 contains Pt and solid electrolyte made of ceramic material which is the same type of ceramic material forming the solid electrolyte body 2.

Figure 7:
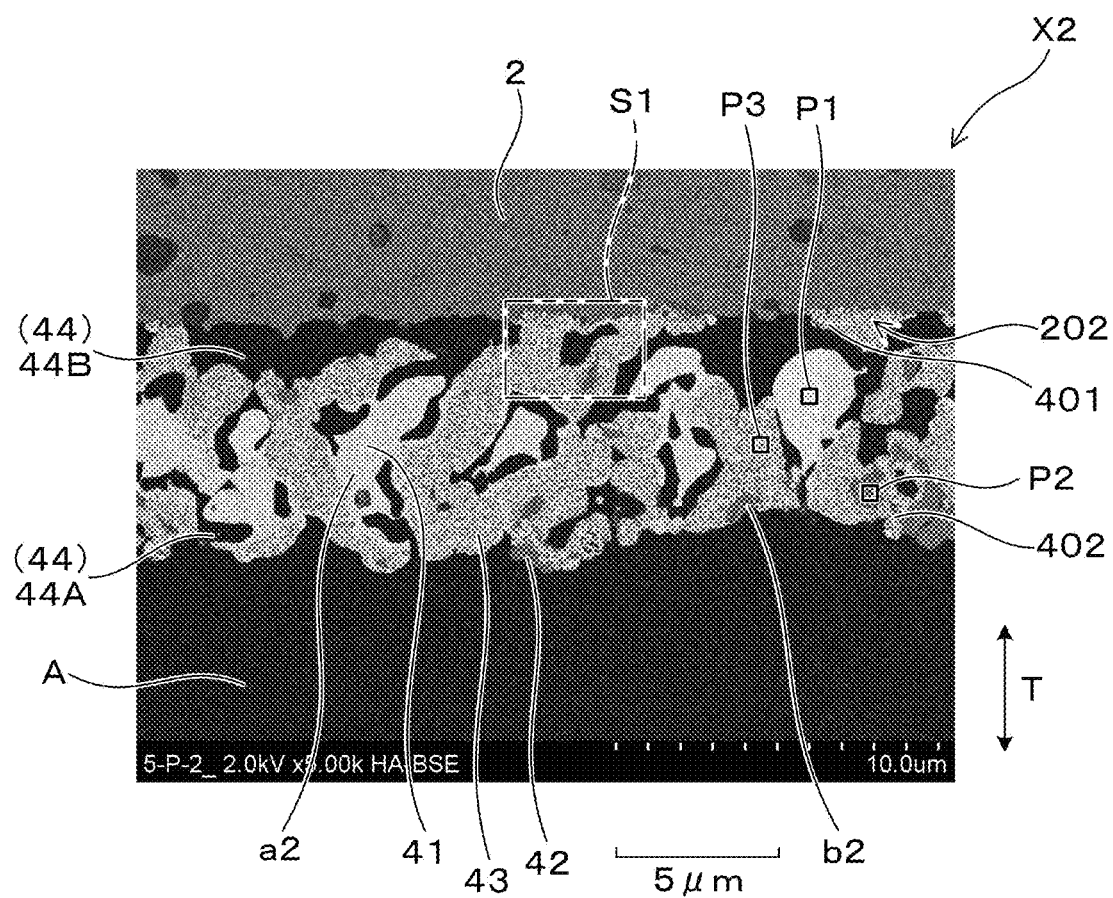
FIG. 7 is a SEM photograph showing a cross sectional surface of the reference electrode according to the exemplary embodiment of the present invention.
Figure 8:
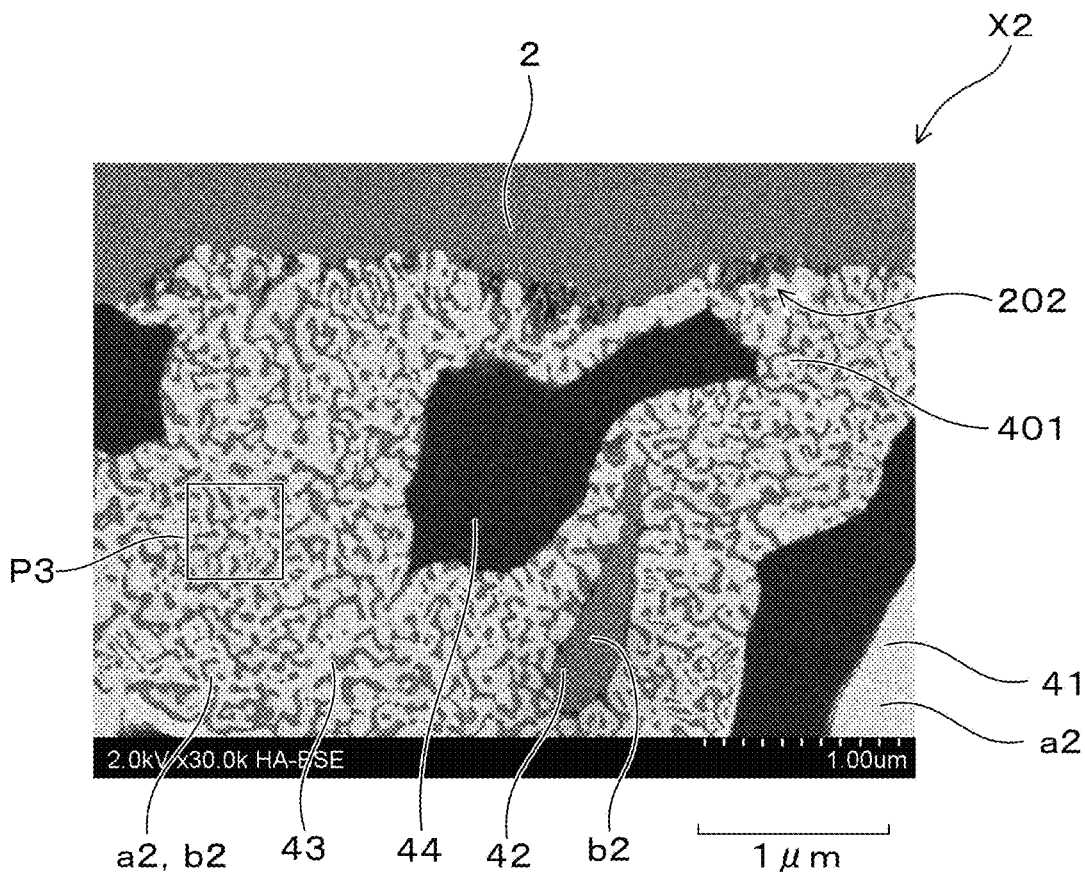
FIG. 8 is an enlarged view showing a part of the SEM photograph shown in FIG. 7.

As shown in FIG. 7 and FIG. 8, a noble metal area (a second noble metal area) 41, a solid electrolyte area (a second solid electrolyte area) 42, a mixture area (a second mixture area) 43, and pores (second pores) 44 are formed on a cross sectional surface X2 which is cut along a thickness direction T of the reference electrode 4. Pt aggregations are formed in the noble metal area 41. Solid electrolyte aggregations are formed in the solid electrolyte area 42. A mixture of Pt and the solid electrolyte is formed with patchy distribution in the mixture area 43. At least a part of the mixture area 43 is formed from the boundary position (a second boundary position) 401 adjacent to the reference gas-side surface 202 of the solid electrolyte body 2 to a surface position 402 of the reference electrode 4. The mixture area 43 occupies a range of 30 to 90% of the overall area, excepting the pores 44, on the cross sectional surface X2 (the cross sectional surface of the reference electrode). The pores 44 are formed adjacent to the mixture area 43. In each of the drawings, reference character a 2 Pt, and reference character b2 indicates the solid electrolyte.

A description will now be given of a gas sensor. This gas sensor uses a gas sensor element 1 in which the pump electrode and the reference electrode according to the exemplary embodiment are formed. The gas sensor is arranged in an exhaust gas purification system of an internal combustion engine, and detects a concentration of NOx (nitrogen oxide)

as a specific gas contained in exhaust gas which is discharged from the internal combustion engine to the outside through the exhaust gas purification system. The gas sensor element 1 has a rod shape, and attached to a housing of the gas sensor through an insulation glass. The front end part of the gas sensor element 1, which protrudes from the insulation glass, is covered with a cover having a hole through which the target gas G to be measured is introduced into the gas sensor element 1.

As shown in FIG. 1 and FIG. 2, the solid electrolyte body 2 has a plate shape. A target gas chamber 101 is formed on the target gas-side surface 201 of the solid electrolyte body 2. The target gas G to be measured is introduced in the target gas chamber 101.

An electrically insulating first spacer 62 having electric insulation is stacked around the target-gas side surface 201 of the solid electrolyte body 2. An opposing plate 61 is stacked on the electrically insulating first spacer 62. The target gas chamber 101 is surrounded and formed by the solid electrolyte body 2, the opposing plate 61 and the electrically insulating first spacer 62. A porous body 621 having a predetermined diffusion resistance is embedded in the front end side of the electrically insulating first spacer 62 so as to introduce the target gas G to be measured.

A reference gas chamber 102 is formed on the reference gas-side surface 202 of the solid electrolyte body 2, which is opposite in position to the target-gas side surface 201 of the solid electrolyte body 2. Atmospheric gases are introduced as the reference gas A into the reference gas chamber 102

An electrically insulating second spacer 64 having electric insulation is stacked around the reference-gas side surface 202 of the solid electrolyte body 2. A heater substrate 63 having electric insulation is stacked on the electrically insulating second spacer 64. A heating body 631 is embedded in the inside of the heater substrate 63. The heating body 631 generate heat energy when receiving electric power. The reference gas chamber 102 is surrounded and formed by the solid electrolyte body 2, the electrically insulating second spacer 64 and the heater substrate 63. The reference gas A is introduced into the inside of the reference gas chamber 102 from the distal end side of the electrically insulating second spacer 64.

As shown in FIG. 1, the pump electrode 3 is arranged on the target-gas side surface 201, close in position to the porous body 621, at the front end side of the target-gas side surface 201 of the solid electrolyte body 2. The reference electrode 4 is arranged at the front end side of the reference gas-side surface 202, at the reverse position of the pump electrode 3. A voltage supply means 71 supplies a predetermined voltage between the pump electrode 3 and the reference electrode 4. When the voltage supply means 71 supplies a predetermined voltage between the pump electrode 3 and the reference electrode 4, oxygen molecules contained in the target gas G to be measured in the target gas chamber 101 are decomposed to oxide ions on a three phase boundary of Pt—Au alloy and the solid electrolyte on the surface of the pump electrode 3. Those oxide ions pass through the solid electrolyte body 2 to the surface of the reference electrode 4. When receiving electrons on the three phase boundary between Pt and the solid electrolyte on the surface of the reference electrode 4, the oxide ions become oxygen molecules again. That is, the oxygen molecules are discharged from the target gas chamber 101 to the reference gas chamber 102.

As shown in FIG. 1 and FIG. 2, a sensor electrode 51 and a monitor electrode 52 are arranged adjacent to each other in a lateral direction at the distal end side (at a downstream side of flow of the target gas G) rather in position than the pump electrode 3 arranged on the target gas-side surface 201 of the solid electrolyte body 2. NOx and oxygen are activated by the sensor electrode 51. The sensor electrode 51 detects a concentration of NOx contained in the target gas G after the pump electrode 3 has adjusted a concentration of oxygen. Oxygen is activated by the monitor electrode 52. The monitor electrode 52 detects a concentration of oxygen remaining in the target gas G after the pump electrode 3 has adjusted a concentration of oxygen.

The reference electrode 4 is arranged on the reference gas-side surface 202 of the solid electrolyte body 2, at the reverse position of the sensor electrode 51 and the monitor electrode 52. One reference electrode 4 is arranged to a group of the pump electrode 3, sensor electrode 51 and the monitor electrode 52. It is also acceptable to arrange plural reference electrodes 4, each of which corresponds to each of the pump electrode 3, the sensor electrode 51 and the monitor electrode 52. The solid electrolyte contained in the solid electrolyte body 2, the solid electrolyte contained in the pump electrode 3 and the solid electrolyte contained in the reference electrode 4 are made of yttria stabilized zirconia. The opposing plate 61, the electrically insulating first spacer 62, the heater substrate 63 and the electrically insulating second spacer 64 are made of alumina.

As shown in FIG. 2, a predetermined voltage is supplied between the sensor electrode 51 and the reference electrode 4 in order to generate limit current characteristics. A sensor current detection means 72 detects an oxide ion current which flows between the sensor electrode 51 and the reference electrode 4 through the solid electrolyte body 2. The predetermined voltage is supplied between the monitor electrode 52 and the reference electrode 4 so as to generate the limit current characteristics. A monitor current detection means 73 detects an oxide ion current which flows between the monitor electrode 52 and the reference electrode 4 through the solid electrolyte body 2. The sensor current detection means 72 detects the oxide ion current generated when NOx and remaining oxygen are decomposed. On the other hand, the monitor current detection means 73 detects the oxide ion current generated when remaining oxygen is decomposed. It is possible to detect the concentration of NOx contained in the target gas G by subtracting the value of the oxide ion current detected by the monitor current detection means 73 from the value of the oxide ion current detected by the sensor current detection means 72.

In the overall Pt—Au alloy forming the pump electrode 3 according to the exemplary embodiment, Pt (platinum) is 99 volume %, and Au is 1 volume %. In the overall Pt—Au alloy, it is possible for Pt to be within a range of 95 to 99.9 volume %, and for Au to be within a range of 0.1 to 5 volume %.

Next, a description will be given of the explanation of the pump electrode 3 and the reference electrode 4 according to the exemplary embodiment. FIG. 3 to FIG. 5 are views showing SEM photographs of a cross sectional surface X1 of the pump electrode 3 which has been cut along the thickness direction T of the gas sensor element 1. A scanning electron microscope (SEM) has captured those SEM photographs. The scanning electron microscope is an S5500 manufactured by the Hitachi High-Technologies Corporation. FIG. 3 shows the SEM photograph at 10,000 magnification. FIG. 4 shows a part R1 (at 30,000 magnification) of the SEM photograph shown in FIG. 3. FIG. 5 shows a part R2 (at 100,000 magnification) of the SEM photograph shown in FIG. 4. As shown in each of those SEM photographs, the mixture area 33 made of Pt—Au alloy (a1) and the solid electrolyte (b1) is distributed substantially everywhere on the cross sectional surface X1 of the pump electrode 3.

The mixture area 33 is formed from a boundary positon 301 of the pump electrode 3 to a surface position 302 of the pump electrode 3, excepting the noble metal area 31, the solid electrolyte area 32 or the pores area 34. Inter-grain boundaries E are present within an area P3 of 0.5 µm square. Pt—Au alloy is separated from the solid electrolyte by the inter-grain boundaries E (see SEM photograph shown in FIG. 5).

Figure 6:
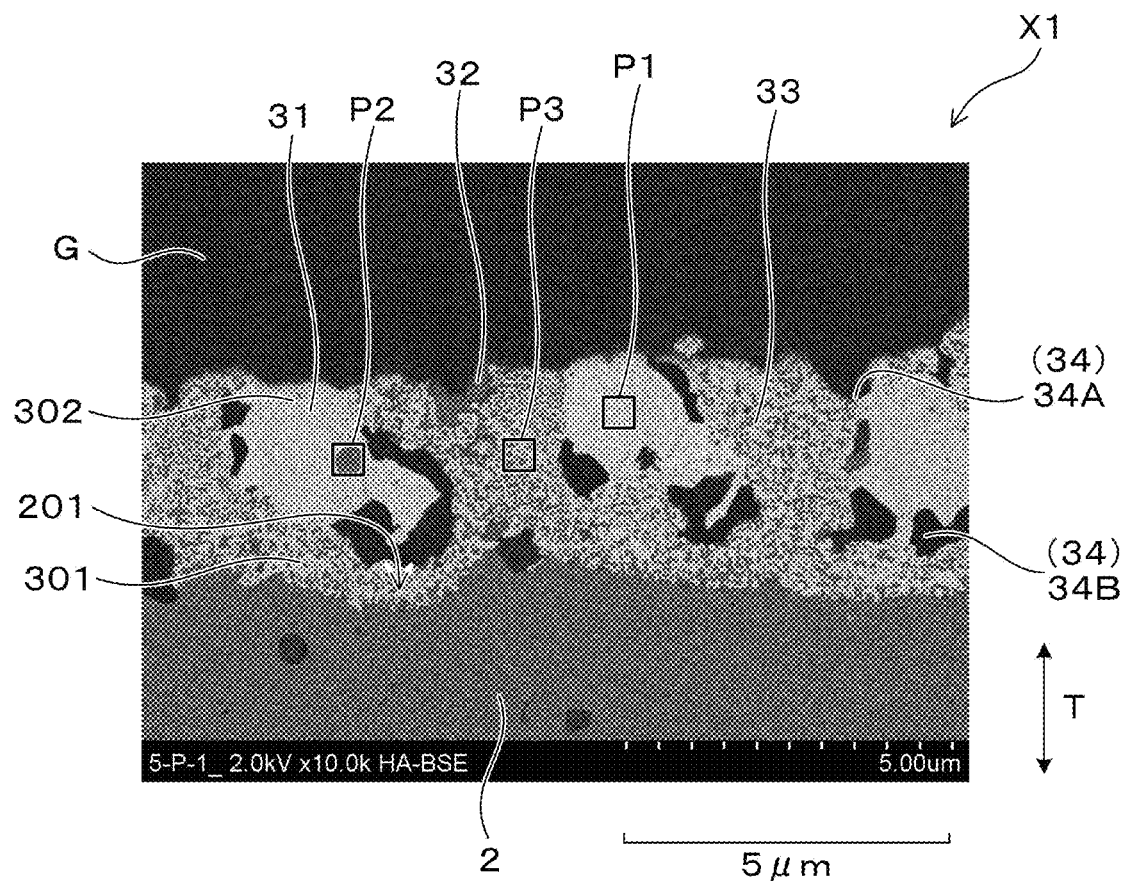
FIG. 6 is a SEM photograph showing another cross sectional surface of the pump electrode according to the exemplary embodiment of the present invention.

Pt—Au alloy and the solid electrolyte are mixed together and contact with each other to form a three-dimensional intermingle structure in the mixture area 33. A part of Pt—Au alloy in the mixture area 33 is in contact with Pt—Au alloy in the noble metal area 31 to form a continuous phase. Further, a part of the solid electrolyte in the mixture area 33 is in contact with the solid electrolyte in the solid electrolyte area 32 and the solid electrolyte body 2 to form a continuous phase. FIG. 6 shows a SEM photograph showing a cross sectional surface X1 of another part of the pump electrode 3 (at 10,000 magnification).

FIG. 7 and FIG. 8 are views showing SEM photographs of a cross sectional surface X2 of the reference electrode 4 which has been cut along the thickness direction T of the gas sensor element 1. The scanning electron microscope (SEM) has captured those SEM photographs. Similar to the SEM photographs shown in FIG. 3 to FIG. 6 previously described, the scanning electron microscope is an S5500 manufactured by the Hitachi High-Technologies Corporation. FIG. 7 shows the SEM photograph at 5,000 magnification. FIG. 8 shows an enlarged part (at 30,000 magnification) of the SEM photograph shown in FIG. 8. In each of the SEM photographs shown in FIG. 7 and FIG. 8, the mixture area 43 made of Pt (a2) and the solid electrolyte (b2) is distributed substantially everywhere on the cross sectional surface X2 of the reference electrode 4.

The mixture area 43 is formed from a boundary position 401 of the reference electrode 4 to a surface position 402 of the reference electrode 4, excepting the noble metal area 41, the solid electrolyte area 42 or the pores area 44.

Inter-grain boundaries are present within an area P3 of 0.5 µm square. Pt is separated from the solid electrolyte by the boundary line. Pt and the solid electrolyte are mixed together and contact with each other to form a three-dimensional intermingle structure in the mixture area 43. A part of Pt in the mixture area 43 is in contact with Pt in the noble metal area 41 to form a continuous phase. Further, a part of the solid electrolyte in the mixture area 33 is in contact with the solid electrolyte in the solid electrolyte area 42 and the solid electrolyte body 2 to form a continuous phase.

When the gas sensor element 1 of the gas sensor is produced, an electrode material paste of each of the pump electrode 3, the reference electrode 4, the sensor electrode 41, and the monitor electrode 52 is applied on a ceramic sheet of the solid electrolyte to form a solid electrolyte sheet. The solid electrolyte sheet, the opposing plate 61, the electrically insulating first spacer 62, the heater substrate 63 and the electrically insulating second spacer 64 are stacked to form a lamination body. The lamination body is fired while a predetermined force is supplied in a stacked direction to the lamination body. After this, a predetermined voltage is supplied between the pump electrode 3 and the reference electrode 4 during a predetermined period of time. It is possible to use this supplied voltage which is higher than a voltage supplied between the pump electrode 3 and the reference electrode 4 by the voltage supply means 71 during the operation of the gas sensor.

After the firing process and before the electric power supplying process, a large part of the pump electrode 3 contains the noble metal area 31 in which Pt—Au alloy aggregations are formed, and the solid electrolyte area 32 in which the solid electrolyte aggregations are formed, and contains a less part of the pores 34. The pump electrode 3 contains approximately no mixture area 33.

After the electric power supplying process of supplying electric power to the pump electrode 3, it can be considered that Pt—Au alloy in the noble metal area 31 in the pump electrode 3 migrates to the target gas-side surface 201 of the solid electrolyte body 2. Further, it can be considered that Pt—Au alloy in the noble metal area 31 of the pump electrode 3 is completely embedded within the interior of the solid electrolyte in the solid electrolyte area 32 of the pump electrode 3. The electric supplying process forms the mixture area 33 in which Pt—Au alloy and the solid electrolyte are distributed in an intermingle structure. It can be considered that the pores 34 are formed in the area, from which Pt—Au alloy has been moved.

As previously described, the electric power supplying process form the mixture area 33 and the pores 34 in the pump electrode 3, and this reduces the formation area of the noble metal area 31 and the solid electrolyte area 32.

After the firing process and before the electric power supplying process, a large part of the reference electrode 4 contains the noble metal area 41 in which Pt aggregations are formed, and the solid electrolyte area 42 in which the solid electrolyte aggregations are formed, and contains a less part of the pores 44. The reference electrode 4 does not approximately contain the mixture area 43.

After the electric power supplying process of supplying electric power to the reference electrode 4, it can be considered that Pt in the noble metal area 41 in the reference electrode 4 migrates to a direction opposite to the reference gas-side surface 202 of the reference electrode 4. Further, it can be considered that Pt in the noble metal area 41 of the reference electrode 4 is completely embedded within the interior of the solid electrolyte in the solid electrolyte area 42 of the reference electrode 4. The electric supplying process forms the mixture area 43 in which Pt and the solid electrolyte are distributed in an intermingle structure. It can be considered that the pores 44 are formed in the area from which Pt has been moved. As previously described, the electric power supplying process form the mixture area 43 and the pores 44 in the reference electrode 4, and this reduces the formation area of the noble metal area 41 and the solid electrolyte area 42.

Instead of generating the pores 34 in the pump electrode 3 by the electric power supplying process, it is acceptable to add pore-imparting agent in the electrode paste forming the pump electrode 3. The pore-imparting agent is destroyed by firing and the pores 34 are formed in the pump electrode 3. Similarly, it is acceptable to use the pore-imparting agent so as to form the pores 44.

In the SEM photographs shown in FIG. 3 to FIG. 5, the mixture area 33 is distributed in many areas on the cross sectional surface X1 of the pomp electrode 3, which is close to the boundary position 301 adjacent to the target gas-side surface 201 of the solid electrolyte body 2, when compared with the noble metal area 31, the solid electrolyte area 32 and the pores 34. The mixture area 33 occupies a large part close to the boundary position 301 of the pump electrode 3. A large area of the pores 34 is formed in the area excepting the boundary position 301 in the pump electrode 3. The noble metal area 31, the solid electrolyte area 32 and the pores 34 are distributed in the area excepting the boundary line 301 in the pump electrode 3.

In the SEM photograph shown in FIG. 7, the pores 44 are distributed at a large area on the cross sectional surface X2 of the reference electrode 4, which is close to the boundary position 401 adjacent to the reference gas-side surface 202 of the solid electrolyte body 2, when compared with the noble metal area 41 and the solid electrolyte area 42. The mixture area 43 and the pores 44 occupy a large area close to the boundary position 401 of the reference electrode 4.

In the SEM photographs shown in FIG. 3 to FIG. 5, the area P1 of a 0.5 μm square in the noble metal area 31 is made of Pt—Au alloy on the cross sectional surface X1 of the pump electrode 3. The area P2 of a 0.5 μm square in the solid electrolyte area 32 is made of solid electrolyte on the cross sectional surface X1 of the pump electrode 3. The area P3 of a 0.5 μm square in the mixture area 33 has inter-grain boundaries E on the cross sectional surface X1 of the pump electrode 3. Each of the inter-grain boundaries E separates Pt—Au alloy from the solid electrolyte. It is acceptable to use 2 μm square to measure each of the areas P1 to P3.

In the SEM photographs shown in FIG. 7 and FIG. 8, the area P1 of a 0.5 μm square in the noble metal area 41 is made of Pt on the cross sectional surface X2 of the reference electrode 4. The area P2 of a 0.5 μm square in the solid electrolyte area 42 is made of solid electrolyte on the cross sectional surface X2 of the reference electrode 4. The area P3 of a 0.5 μm square in the mixture area 4. Each has plural inter-grain boundaries E on the cross sectional surface X2 of the reference electrode 4. Each of the inter-grain boundaries E separates Pt from the solid electrolyte. It is acceptable for each of the areas P1 to P3 to have an optional shape of 0.1 μm$^2$.

In the SEM photograph shown in FIG. 3, open pores 34A having an opening shape embedded in the surface of the pump electrode 3 and independent pores 34B having a closed shape formed in the inside of the pump electrode 3. The pores 34 are continuously formed in a three dimensional structure. The independent pores 34B often change to the open pores 34A on a different surface X1. The pores 34 in the pump electrode 3 are formed within a range of 20 to 50% of the overall volume of the pump electrode 3. In other words, the pump electrode 3 has a porosity within a range of 20 to 50% of the overall volume of the pump electrode 3. The surface position 302 of the pump electrode 3 has a complicated uneven shape. Plural open pores 34A are formed in the surface position 302 of the pump electrode 3. The target gas G to be measured is in contact with Pt—Au alloy and the solid electrolyte in the mixture area 33 through the open pores 34A.

In the SEM photograph shown in FIG. 7, open pores 44A having an opening shape embedded in the surface of the reference electrode 4 and independent pores 44B having a closed shape formed in the inside of the reference electrode 4. The pores 44 are continuously formed in a three dimensional structure. The independent pores 44B often change to the open pores 44A on a different surface X2. The pores 44 in the reference electrode 4 are formed within a range of 20 to 60% of the overall volume of the reference electrode 4. In other words, the reference electrode 4 has a porosity within a range of 20 to 60% of the overall volume of the reference electrode 4. The surface position 402 of the reference electrode 4 has a complicated uneven shape. Plural open pores 44A are formed in the surface position 402 of the reference electrode 4. The reference gas A is in contact with Pt and the solid electrolyte in the mixture area 43 through the open pores 44A.

Next, a description will be given of the action and effects of the pump electrode 3 and the reference electrode 4 according to the exemplary embodiment.

The noble metal area 31, the solid electrolyte area 32, the mixture area 33, and the pores 34 are formed on the cross sectional surface X1 which is cut along the thickness direction T of the pump electrode 3. The mixture area 33 is formed within a range of 30 to 90% of the overall area, excepting the pores 34 on the cross sectional surface X1 of the pump electrode 3. This structure makes it possible to distribute the mixture area 33 in a wide area of the pump electrode 3 and to increase the area to be in contact with the target gas G to be measured.

At least a part of the mixture area 33 is distributed from the boundary position 301 to the surface position 302 of the pump electrode 3. This structure makes it possible for the target gas G to be in contact with the mixture area 33 in the thickness direction T of the pump electrode 3. Further, the pores 34 are formed adjacent to the mixture area 33 on the cross sectional surface X1 of the pump electrode 3. This structure makes it possible for the target gas G introduced into the pores 34 to be in contact with the mixture area 33, and to increase the area of the three phase boundary between the noble metal, the solid electrolyte and the target gas G in the mixture area 33 with high efficiency.

The noble metal area 41, the solid electrolyte area 42 and the mixture area 43, and the pores 44 are formed on the cross sectional surface X2 which is cut along the thickness direction T of the reference electrode 4. The mixture area 43 is formed within a range of 30 to 90% of the overall area, excepting the pores 44 on the cross sectional surface X2 of the reference electrode 4. This structure makes it possible to distribute the mixture area 43 in a wide area of the reference electrode 4 and to increase the area to be in contact with the reference gas A.

At least a part of the mixture area 43 is distributed from the boundary position 401 to the surface position 402 of the reference electrode 4. This structure makes it possible for the reference gas A to be in contact with the mixture area 43 in the thickness direction T of the reference electrode 4. Further, the pores 44 are formed adjacent to the mixture area 43 on the cross sectional surface X2 of the reference electrode 4. This structure makes it possible for the reference gas A introduced into the pores 44 to be in contact with the mixture area 43, and to increase the area of the three phase boundary between the noble metal, the solid electrolyte and the reference gas A in the mixture area 43 with high efficiency.

Accordingly, the mixture area 33 in which the noble metal and the solid electrolyte are mixed together and the pores 34 into which the target gas G is introduced are formed in appropriate proportions in the pump electrode 3 according to the exemplary embodiment to be used in the gas sensor according to the exemplary embodiment.

In addition, the mixture area 43 in which the noble metal and the solid electrolyte are mixed together and the pores 44 into which the reference gas A is introduced are formed in appropriate proportions in the reference electrode 4 according to the exemplary embodiment to be used in the gas sensor according to the exemplary embodiment.

The gas sensor according to the exemplary embodiment having the structure previously described can enhance the oxygen decomposition activation function of the pump electrode 3 and the reference electrode 4 with high efficiency.

(Recognition Experiment)

In order to evaluate the oxygen decomposition activation function of the pump electrode 3 and the reference electrode 4, the recognition experiment recognized a change ratio (output current change ratio) α of an oxide ion current I detected by the sensor current detection means 72. The oxide ion current I varies due to the oxygen decomposition activation function of the pump electrode 3 and the reference electrode 4.

The output current change ratio α corresponds to a detection accuracy of the gas sensor capable of detecting a concentration of NOx contained in the target gas G to be measured. When increasing the oxygen decomposition activation function of the pump electrode 3 and the reference electrode 4, the output current change ratio α is reduced.

Figure 9:
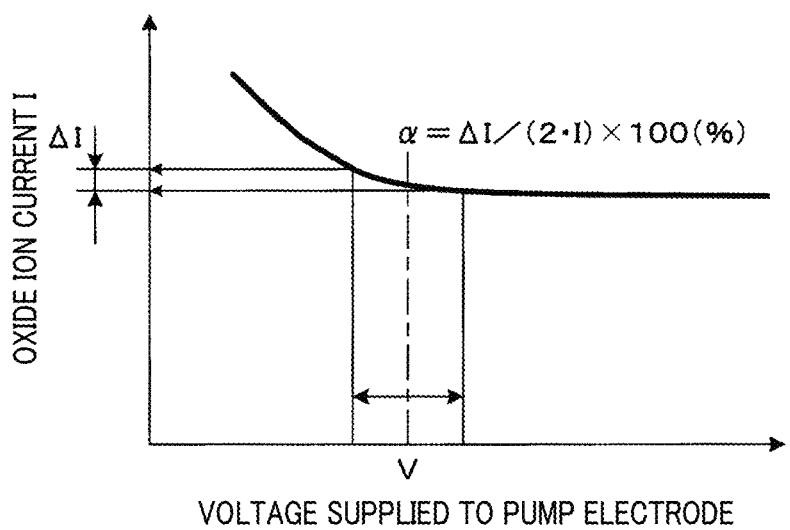
FIG. 9 is a graph showing a relationship between an supplied voltage supplied to the pump electrode of the exemplary embodiment of the present invention and an oxide ion current detected by a sensor current detection means.

As shown by the graph in FIG. 9, the output current change ratio α represents a change ratio of the oxide ion current I detected by the sensor current detection means 72 when the voltage V to be supplied between the pump electrode 3 and the reference electrode 4 varies due to the variation of the oxygen decomposition activation function.

The output current change ratio α varies due to the variation of an amount of remaining oxygen in the target gas G, from which oxygen has been discharged by the pump electrode 3 and the reference electrode 4. The output current change ratio α can be expressed by the equation:

$$\alpha = \Delta I/(2 \cdot I) \times 100 (\%),$$

where ΔI indicates a change ratio of the oxide ion current I detected by the sensor current detection means 72.

Figure 10:
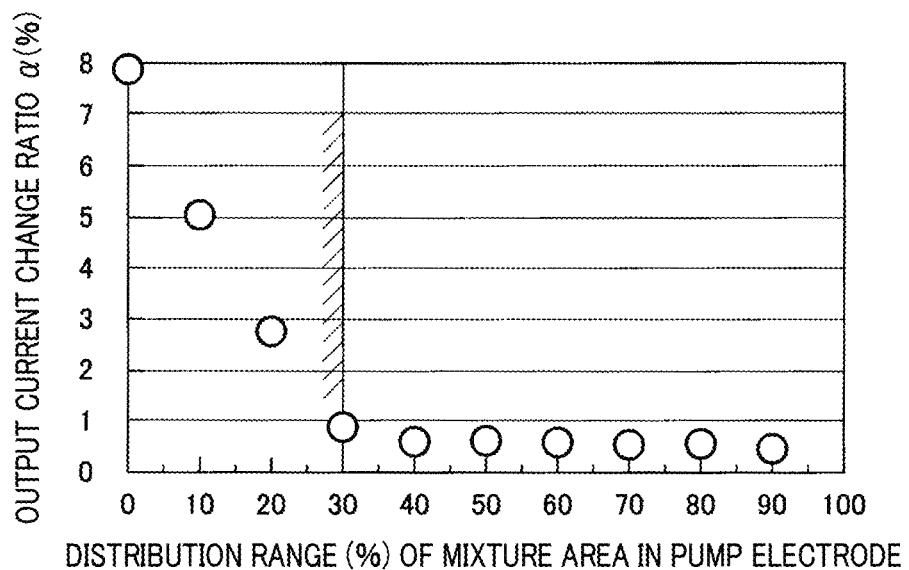
FIG. 10 is a graph showing a relationship between a distribution range of the mixture area in the pump electrode according to the exemplary embodiment of the present invention and an output current change ratio.

FIG. 10 is a graph showing a relationship between a distribution range of the mixture area 33 in the pump electrode 3 (i.e. a distribution range (%) of the overall area, excepting the pores 34, on the cross sectional surface X1) and an output current change ratio α (%). In the graph shown in FIG. 10, when the distribution range of the mixture area 33 in the pump electrode 3 is not less than 30%, it is possible to maintain the output current change ratio α of a small value. On the other hand, when the distribution range of the mixture area 33 in the pump electrode 3 is less than 30%, there is a tendency in which the output current change ratio α increases. Accordingly, FIG. 10 clearly shows that it is possible to increase the oxygen decomposition activation function of the pump electrode 3 which relates to the output current change ratio α when the distribution range of the mixture area 33 in the pump electrode 3 becomes not less than 30%.

Figure 11:
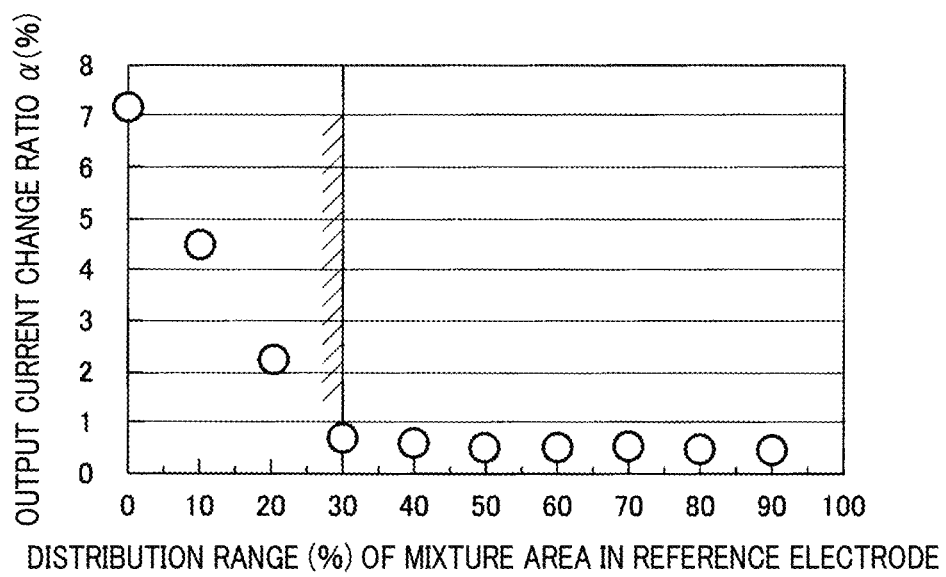
FIG. 11 is a graph showing a relationship between a distribution range of the mixture area in the reference electrode according to the exemplary embodiment of the present invention and the output current change ratio.

FIG. 11 is a graph showing a relationship between a distribution range of the mixture area 43 in the reference electrode 4 and the output current change ratio α.

In the graph shown in FIG. 11, when the distribution range of the mixture area 34 in the reference electrode 4 is not less than 30%, it is possible to maintain the output current change ratio α of a small value. On the other hand, when the distribution range of the mixture area 33 in the reference electrode 4 is less than 30%, there is a tendency in which the output current change ratio α increases. Accordingly, FIG. 11 clearly show that it is possible to increase the oxygen decomposition activation function of the reference electrode 4, which relates to the output current change ratio α when the distribution range of the mixture area 43 in the reference electrode 4 becomes not less than 30%.

Figure 12:
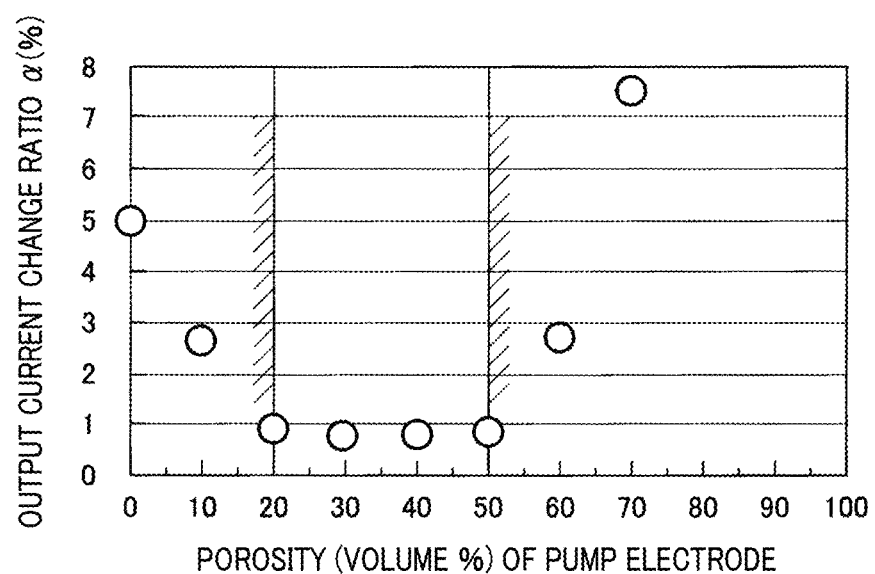
FIG. 12 is a graph showing a relationship between a porosity of the pump electrode and the output current change ratio of the pump electrode according to the exemplary embodiment of the present invention.

FIG. 12 is a graph showing a relationship between a porosity (volume %) of the pump electrode 3 (i.e. a volume of the pores 34 in the overall volume the pump electrode 3) and the output current change ratio α (%).

The porosity of the pump electrode 3 was obtained by observing a plurality of cross sectional areas by using a scanning electron microscope (SEM). The plurality of cross sectional areas was cut by using a focused ion beam (FIB) apparatus. The porosity of the pump electrode was obtained based on the analysis method of a three-dimensional structure called as the FIB-SEM method.

As shown in the graph of FIG. 12, when the porosity of the pump electrode 3 is within a range of 20 to 50 volume %, the current change ratio α of a small value is maintained.

On the other hand, there is a tendency in which the output current change ratio α of the pump electrode 3 becomes increase according to the reduction of the porosity of the pump electrode 3 of less than 20 volume %.

In addition, there is a tendency in which the output current change ratio α becomes increase according to increasing of the porosity of the pump electrode 3 of more than 50 volume %.

A conduction failure of the pump electrode 3 occurs when the porosity of the pump electrode 3 exceeds 80 volume %. Accordingly, FIG. 12 clearly show that it is possible to increase the oxygen decomposition of the pump electrode 3 when the porosity of the pump electrode 3 is within a range of 20 to 50 volume %.

Figure 13:
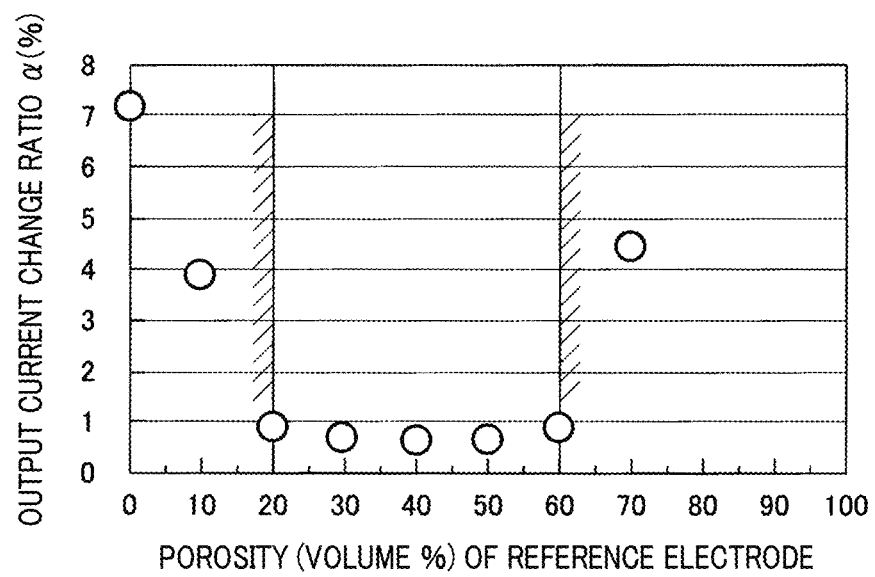
FIG. 13 is a graph showing a relationship between a porosity in the reference electrode and the output current change ratio of the reference electrode according to the exemplary embodiment of the present invention.

FIG. 13 is a graph showing a relationship between a porosity (volume %) of the reference electrode 4 (i.e. a volume of the pores 44 in the overall volume the reference electrode 4) and the output current change ratio α (%).

The porosity of the reference electrode 4 was obtained by using the same method of obtaining the porosity of the pump electrode 3 previously described. As shown in the graph of FIG. 13, when the porosity of the reference electrode 4 is within a range of 20 to 60 volume %, the current change ratio α of a small value is maintained. On the other hand, there is a tendency in which the output current change ratio α of the reference electrode 4 becomes increase according to the reduction of the porosity of the reference electrode 4 of less than 20 volume %. In addition, there is a tendency in which the output current change ratio α increases according to increasing of the porosity of the reference electrode 4 of more than 60 volume %. A conduction failure of the reference electrode 4 occurs when the porosity of the reference electrode 4 exceeds 80 volume %. Accordingly, FIG. 13 clearly shows that it is possible to increase the oxygen decomposition of the reference electrode 4 when the porosity of the reference electrode 4 is within a range of 20 to 60 volume %.

REFERENCE SIGNS LIST

1 Gas sensor element, 2 Solid electrolyte, 201 Target gas-side surface, 202 Reference gas-side surface, 3 Pump electrode, 4 Reference electrode, 301 Boundary position (First boundary position), 401 Boundary position (Second boundary position), 302 Surface position of pump electrode, 402 Surface position of reference electrode, 31 Noble metal area (First noble metal area), 41 Noble metal area (Second noble metal area), 32 Solid electrolyte area (First electrolyte area), 42 Solid electrolyte area (Second electrolyte area), Mixture area (First mixture area), 43 Mixture area (Second mixture area), 34 Pores (First pores), 44 Pores (Second pores), X1 Cross sectional surface (cut surface of pump electrode), X2 Cross sectional surface (Cut surface of reference electrode), G Target gas to be measured, A Reference gas, and T Thickness direction.

The invention claimed is:

1. A pump electrode for a gas sensor, formed on a target gas-side surface of a solid electrolyte body having ion conductivity, the target gas-side surface being exposed to a target gas to be measured, the pump electrode decomposing oxygen contained in the target gas into oxide ions by a first electric power supplied to the pump electrode, the oxide ions passing through the solid electrolyte body and being discharged to a reference gas-side surface of the solid electrolyte body which is arranged in opposite in position to the target gas-side surface, wherein the pump electrode is made of Pt—Au alloy and a solid electrolyte made of ceramic material which is the same type of ceramic material forming the solid electrolyte body, a first noble metal area, a first solid electrolyte area, a first mixture area and first pores are formed in the pump electrode, and a cross section of the pump electrode is cut along a thickness direction of the pump electrode, wherein Pt—Au alloy aggregations are formed in the first noble metal area, solid electrolyte aggregations are formed in the first solid electrolyte area, Pt—Au alloy and the solid electrolyte are mixed with each other in a three-dimensional structure in the first mixture area, the first mixture area has an area within a range of 30 to 90% in an area without the first pores, and the first pores are continuously formed in the three-dimensional structure and formed adjacent to the first mixture area, the first mixture area is formed from a boundary position of the pump electrode to a surface position of the pump electrode, excepting the first noble metal area, the first solid electrolyte area, and the first pores, and the boundary position of the pump electrode is positioned between the pump electrode and the solid electrolyte body, at least part of the first mixture area is formed and extends entirely and continuously from the boundary position of the pump electrode adjacent to the target gas-side surface of the solid electrolyte body to the surface position of the pump electrode, which is exposed to the target gas, a plurality of inter-grain boundaries is present within a predetermined area in the first mixture area, the plurality of inter-grain boundaries separating Pt—Au alloy from the solid electrolyte, the first pores comprise first open pores having an opening shape embedded in a surface of the pump electrode and first independent pores having a closed shape formed in the inside of the pump electrode, a plurality of the first open pores are formed in the surface position of the pump electrode so that the target gas to be measured is in contact with Pt—Au alloy and the first solid electrolyte in the first mixture area through the first open pores, and the first pores occupy a volume within a range of 20 to 50 volume % in the overall volume of the pump electrode.

2. The pump electrode for a gas sensor according to claim 1, wherein the first noble metal area is within a range of 0.5 μm square made of Pt—Au alloy on a cross sectional surface of the pump electrode, the first solid electrolyte area is within a range of 0.5 μm square made of the solid electrolyte on the cross sectional surface of the pump electrode, and the first mixture area is within a range of 0.5 μm square made of Pt—Au alloy and the solid electrolyte, excepting the first noble metal area and the first solid electrolyte area, on the cross sectional surface of the pump electrode.

3. The pump electrode for a gas sensor according to claim 1, wherein the first mixture area is wider than the first noble metal area, the first solid electrolyte area and the first pores, in an area close to the boundary position which is adjacent to the target gas-side surface of the solid electrolyte body on a cross sectional surface of the pump electrode.

4. A gas sensor element comprising: the pump electrode according to claim 1 and a reference electrode; wherein:

the reference electrode is formed on the reference gas-side surface of the solid electrolyte body, exposed to a reference gas, the solid electrolyte body having ion conductivity, the oxide ions decomposed from oxygen contained in the target gas to be measured when a second electric power being supplied to the reference electrode, the target gas-side surface of the solid electrolyte body, exposed to the target gas, which is opposite to the reference gas-side surface, the oxide ions passing through the solid electrolyte body and being discharged to the reference gas-side surface of the solid electrolyte body, the reference electrode is made of Pt and the solid electrolyte made of ceramic material which is the same type of ceramic material forming the solid electrolyte body, a second noble metal area, a second solid electrolyte area, a second mixture area and second pores are formed in the reference electrode, a cross section of the reference electrode is cut along a thickness direction of the reference electrode, wherein Pt aggregations are formed in the second noble metal area, solid electrolyte aggregations are formed in the second solid electrolyte area, and a mixture of Pt and the solid electrolyte is formed in the second mixture area, the second mixture area has an area within a range of 30 to 90% in an overall area of the cross section excepting an area of the second pores on the cross section of the reference electrode, and the second pores are formed adjacent to the second mixture area, and the second pores occupy a volume within a range of 20 to 60 volume % in the overall volume of the reference electrode.

5. A reference electrode formed on a reference gas-side surface of a solid electrolyte body, exposed to a reference gas, the solid electrolyte body having ion conductivity, oxide ions decomposed from oxygen contained in a target gas to be measured when electric power being supplied to the reference electrode, a target gas-side surface of the solid electrolyte body, exposed to the target gas, which is opposite to the reference gas-side surface, the oxide ions passing through the solid electrolyte body and being discharged to the reference gas-side surface of the solid electrolyte body, wherein the reference electrode is made of Pt and a solid electrolyte made of ceramic material which is the same type of ceramic material forming the solid electrolyte body, a second noble metal area, a second solid electrolyte area, a second mixture area and second pores are formed in the reference electrode, a cross section of the reference electrode is cut along a thickness direction of the reference electrode, wherein Pt aggregations are formed in the second noble metal area, solid electrolyte aggregations are formed in the second solid electrolyte area, and Pt and the solid electrolyte are mixed with each other in a three-dimensional structure in the second mixture area, the second mixture area has an area within a range of 30 to 90% in an area without the second pores, and the second pores are continuously formed in the three-dimensional structure and formed adjacent to the second mixture area, the second mixture area is formed from a boundary position of the reference electrode to a surface position of the reference electrode, excepting the second noble metal area, the second solid electrolyte area and the second pores, and the boundary position of the reference electrode is positioned between the reference electrode and the solid electrolyte body, at least part of the second mixture area is formed and extends entirely and continuously from the boundary position adjacent to the reference gas-side surface of the solid electrolyte body to the surface position of the reference electrode, which is exposed to the reference gas, a plurality of inter-grain boundaries is present within a predetermined area in the second mixture area, the plurality of inter-grain boundaries separating Pt from the solid electrolyte, the second pores comprise second open pores having an opening shape embedded in a surface of the reference electrode and second independent pores having a closed shape formed in the inside of the reference electrode, a plurality of the second open pores are formed in the surface position of the reference electrode so that the reference gas to be measured is in contact with Pt and the solid electrolyte in the second mixture area through the second open pores, and the second pores occupy a volume within a range of 20 to 60 volume % in the overall volume of the reference electrode.

6. The reference electrode for a gas sensor according to claim 5, wherein the second noble metal area comprises an area within a range of 0.5 µm square made of Pt on a cross sectional surface of the reference electrode, the second solid electrolyte area comprises a part within a range of 0.5 µm square made of solid electrolyte on the cross sectional surface of the reference electrode, and the second mixture area comprises an area within a range of 0.5 µm square made of Pt and the solid electrolyte, excepting the second noble metal area and the second solid electrolyte area, on the cross sectional surface of the reference electrode.

7. The reference electrode for a gas sensor according to claim 5, wherein the second pores has a distributed area which is wider than a distributed area of the second noble metal area, the second solid electrolyte area and the second mixture area, in an area close to the boundary position which is adjacent to the reference gas-side surface of the solid electrolyte body on a cross sectional surface of the reference electrode.

* * * * *

UNITED STATES PATENT AND TRADEMARK OFFICE
CERTIFICATE OF CORRECTION

| | | |
|---|---|---|
| PATENT NO. | : 11,782,017 B2 | Page 1 of 1 |
| APPLICATION NO. | : 15/742148 | |
| DATED | : October 10, 2023 | |
| INVENTOR(S) | : Mitsunobu Nakatou | |

It is certified that error appears in the above-identified patent and that said Letters Patent is hereby corrected as shown below:

On the Title Page

Please correct the assignee from:
(73) Assignees: DENSO CORPORATION, Kariya (JP);
KABUSHIKIKAISHA TOYOTA CHUO KENKYUSHO, Nagakute (JP)

To:
(73) Assignee: DENSO CORPORATION, Kariya (JP)

Signed and Sealed this
Tenth Day of September, 2024

Katherine Kelly Vidal
*Director of the United States Patent and Trademark Office*